United States Patent [19]

Platte

[11] 3,708,082
[45] Jan. 2, 1973

[54] PLASTIC CONTAINER
[75] Inventor: Richard L. Platte, Ann Arbor, Mich. 48105
[73] Assignee: Hoover Ball and Bearing Company
[22] Filed: March 29, 1971
[21] Appl. No.: 129,021

[52] U.S. Cl. ............ 215/1 C, 150/.5, 220/94 A, D9/47
[51] Int. Cl. .............................. B65d 23/10
[58] Field of Search ........... 215/1 C, 1 R; 150/.5, 50; 220/94 A, 97 R, 97 C; 222/107; D9/47, 48, 147, 148

[56] References Cited

UNITED STATES PATENTS

| 3,434,644 | 3/1969 | Collie | 215/1 C |
| 3,397,724 | 8/1968 | Bolen et al. | 215/1 C |
| 3,400,846 | 9/1968 | Kelly | 215/1 C |
| 3,499,567 | 3/1970 | Spotts | 215/1 C |

*Primary Examiner*—Joseph R. Leclair
*Assistant Examiner*—Stephen Marcus
*Attorney*—Olsen & Stephenson

[57] ABSTRACT

A relatively thin walled plastic bottle or jug having a high strength to weight ratio which has its walls shaped to minimize or eliminate harmful deformation during filling or pouring of liquids, and which has an attractive appearance when filled with liquid.

13 Claims, 8 Drawing Figures

PATENTED JAN 2 1973 3,708,082

INVENTOR
RICHARD L. PLATTE

BY OLSEN & STEPHENSON

INVENTOR
RICHARD L. PLATTE
BY
OLSEN & STEPHENSON
ATTORNEYS

PLASTIC CONTAINER

CROSS REFERENCE TO RELATED APPLICATION

This application relates to containers such as are illustrated in pending application, Ser. No. D22,978, filed May 14, 1970 for "Jug", abandoned.

BACKGROUND OF THE INVENTION

The present invention relates to improvements in plastic containers such as bottles and jugs, and is especially directed to improvements which provide a high strength to weight ratio.

In the blow molding of plastic bottles and jugs, one of the significant cost factors is the amount of resin that is required to provide a bottle or jug of sufficient strength which will be self-sustaining in use and which will retain an attractive appearance when on display in stores or other distribution outlets. It is conventional practice for operators of blow molding machinery to select a wall thickness for the extruded parison which will produce a finished product having the desired physical properties. By reducing the wall thickness of the extruded parison, a savings in cost of the raw material will be realized, but the operator is restricted in making cost savings of this character by the design of the bottle or jug. It is essential that he select a wall thickness for the parison which will assure a finished product having a wall that is sufficient in structure to enable the bottle or jug to perform satisfactorily.

For example, in the milk industry, it is desirable that the milk-filled bottle or jug have side walls that appear straight as distinguished from a container that noticeably bulges or sags in lower regions. It is also highly desirable that the container have physical characteristics so that during filling operations or subsequent pouring operations dimpling will not occur at corners of the container. During filling operations, when using conventional milk filling apparatus, partial vacuum conditions occur intermittently within the container, and if the container has wall constructions at the corners which are quite thin, dimpling may occur at these corners. Likewise, if the container is unnecessarily weak at the corners, a collapsing or dimpling may occur during pouring, especially when the milk container is a jug with a hollow handle and the user is holding the relatively full jug only by the handle. The weight of the liquid in the lower regions of the jug may cause collapsing of the jug at the corners or dimpling at these corners. When seeking answers to problems of this character, it has been the general practice in the blow molding industry to look to the wall thickness of the container and then to select a thickness sufficiently great to assure that these problems normally will not arise.

As will be readily understood, increasing the wall thickness in most instances solves the performance problems of the container, but is substantially increases the cost of the raw materials used to produce the container. Furthermore, in the milk industry merely increasing the wall thickness of the container is not a satisfactory answer to the problems that arise during the filling of the container when intermittent partial vacuum conditions occur. When these conditions occur the container will collapse inwardly because of the pressure differential between the inner and outer surfaces of the container causing excessive stress concentrations in certain locations of the container. As the container is filled the pressure of the liquid will seek to restore the container to its original shape, but it is not always successful in accomplishing this result. If dimples or other indentations remain in the container it cannot be used, resulting in a waste product, or if used would have an unsightly appearance. Also, even if all the indentations are eliminated by the restoring action of the liquid, the plastic material may be permanently weakened at certain locations of excess stress concentration so that the containers may subsequently be ruptured if dropped or subjected to other forms of impact. Thus, there is a special need for improvements in plastic containers for the milk industry so that low cost containers having desirable physical properties can be produced.

SUMMARY OF THE INVENTION

The present invention has overcome certain shortcomings of the prior art by providing a thin-walled plastic container having a high strength to weight ratio and which is constructed to accommodate temporary limited collapsing of its walls without harmful effects.

According to one form of the present invention, a relatively thin-walled plastic container is provided having a high strength to weight ratio comprising bottom, side and top wall portions, the top wall portion merging to a neck which defines an outlet for the container. The side wall portion includes four wall-panels which are connected at their vertical edges, the wall-panels being tapered outwardly approximately one-half degree from their lower ends to their upper ends. The wall thicknesses associated with the taper is such that when the container is filled with liquid, the bulging of the wall panels in the lower regions of the container will cause the panels to appear parallel or vertical. In this respect, it is to be understood that the pressures within the container when filled with liquid, increase progressively from the top to the bottom so that there is a greater pressure tending to bulge the walls in the lower regions of the container than in the upper regions.

The container embodying the present invention is also constructed so that the wall-panels are connected at their edges by flat corner-panels which taper inwardly a small degree from their lower ends to their upper ends. When the container is provided with a handle, the latter will be in the form of a hollow handle which is located so that it forms an extension of one of the corner-panels and terminates adjacent to the neck of the container. A rib also is provided in the side wall portion of the container which circumscribes the container in a region below the handle and serves to rigidify the side wall-panels in a circumferential direction while acting as a hinge to allow limited inward collapsing of the container along selected regions. The rib is an inwardly rounded groove which has relatively greater depth in the side wall-panels than in the corner-panels to encourage inward collapsing in the wall-panels rather than in the corner-panels when the container is subject to a partial vacuum. The jug having the characteristics defined above has rigidity in the corner from which the handle extends so that when pouring occurs there will be little tendency of the corners to dimple, and this is also true during filling operations when vacuum conditions intermittently occur in the container. When partial vacuum conditions do occur in the container the wall-panels bow inwardly without harmful collapsing or inward buckling in other localized regions of the container. In effect, the structural features of the container are such that the stresses are dispersed in the walls so as to prevent such stresses from being concentrated in any local region. It is found that a container having the structure set forth above can be formed having a thickness less than 0.030 inch which normally is the minimum thickness used in plastic milk jugs now being manufactured. It is found that the wall thicknesses can be as low as 0.018 inch which will represent a very substantial savings in raw material necessary to form the container. To rigidify the plastic container of this character further, it is desired that the concave undersurface have a transverse reinforcing rib to prevent downward bulging or collapsing of the bottom wall when the container is filled with liquid.

Thus, it is an object of the present invention to provide an improved plastic container which is constructed and arranged so that it has a high strength to weight ratio, permitting relatively lesser amounts of resin to be used in the forming of the container, and which has physical properties making it especially well adapted for use in the milk industry.

Other objects of this invention will appear in the following description and appended claims, reference being had to the accompanying drawings forming a part of this specification wherein like reference characters designate corresponding parts in the several views.

Figures 1, 2, 3, 4:
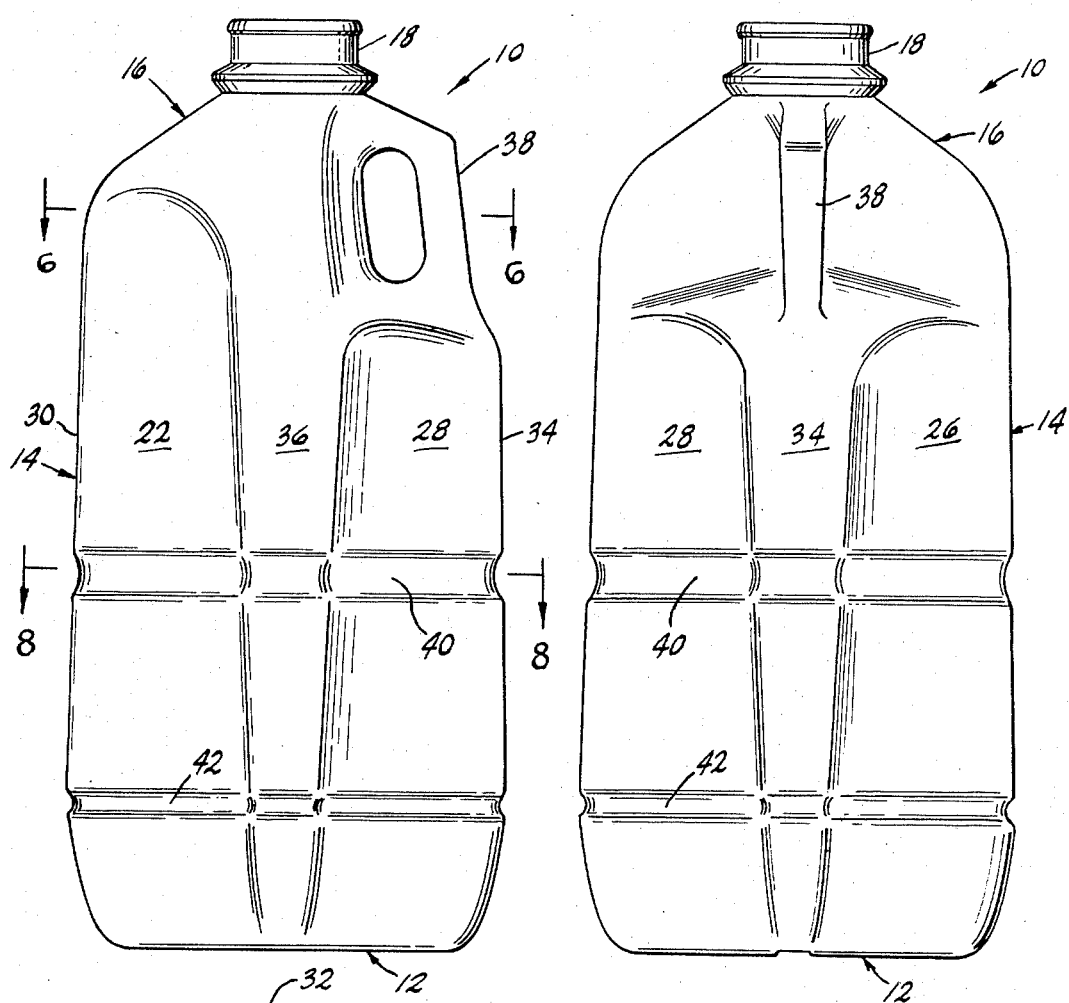
FIG. 1 is a top plan view of a blown plastic jug embodying one form of the present invention.
FIG. 2 is a side elevational view of the jug illustrated in FIG. 1.
FIG. 3 is another side elevational view of the jug as viewed from the right of FIG. 2.
FIG. 4 is a fragmentary section taken on the lines 4—4 of FIG. 1.

DESCRIPTION OF THE PREFERRED EMBODIMENT.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The drawings illustrate a thin-walled blow molded plastic container 10 which may be formed of any suitable organic plastic material, such as a polyethylene resin. The plastic container 10 is in the form of a jug which has a bottom wall portion 12, a side wall portion 14 and a top wall portion 16. The top wall portion 16 merges to a neck 18 which defines the outlet 20 of the container. The side wall portion 14 includes the four wall-panels 22, 24, 26 and 28 which are connected at their vertical edges respectively by the corner panels 30, 32, 34 and 36.

Figure 7:
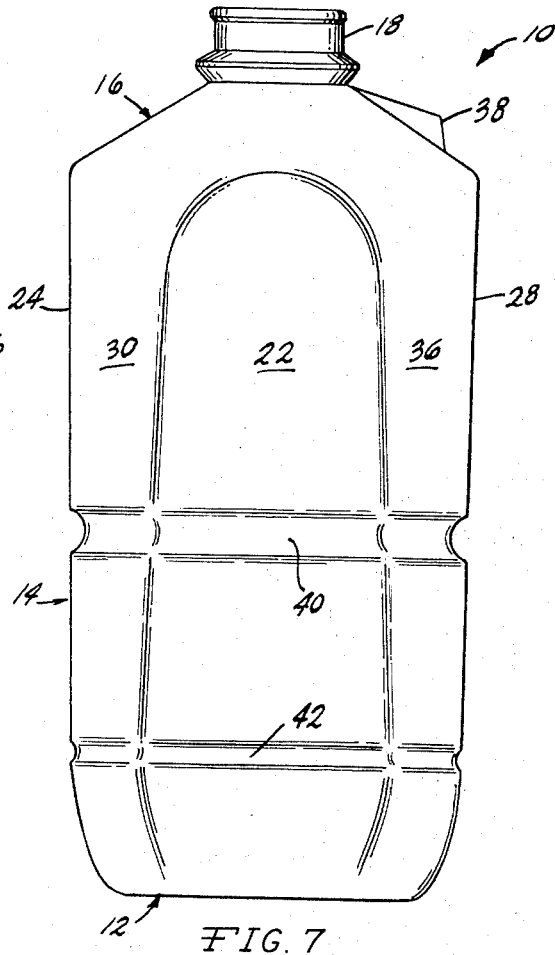
FIG. 7 is still another side elevational view as viewed in the direction of the arrows 7—7 of FIG. 1.
Figure 6:
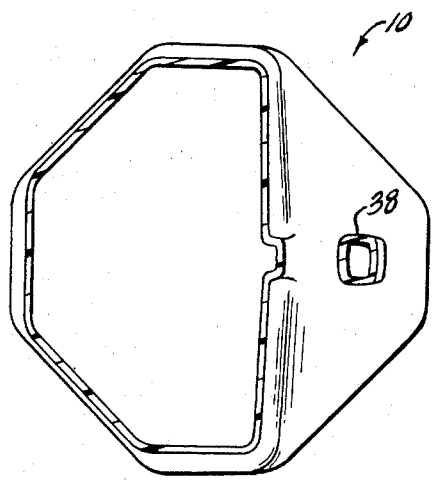
FIG. 6 is a section taken on the line 6—6 of FIG. 2.

As best seen in FIG. 7, the wall panels taper outwardly a small degree from their lower ends to their upper ends so that when the container is empty, the dimension between the opposite side walls 24 and 28 is greater at the top than at the bottom. It is to be understood that the same outward taper occurs between opposite wall-panels 22 and 26 so that these wall-panels also are spaced apart a slightly greater distance at the top than at the bottom. In the illustrated embodiment of the invention, it is preferred that the degree of outward taper of each of the wall-panels is approximately one-half degree.

Figure 5:
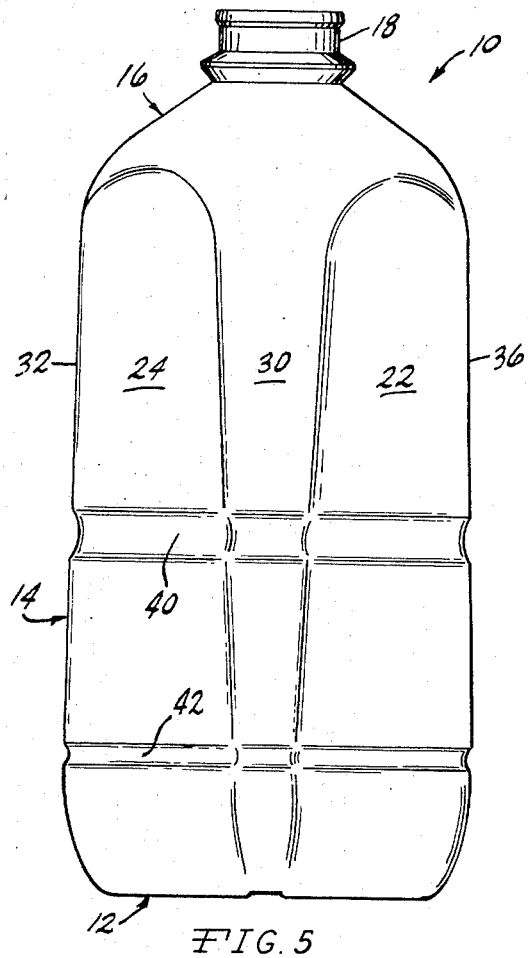
FIG. 5 is another side elevational view as viewed from the left of FIG. 2.

The corner-panels have a taper inwardly a small degree from their lower ends to their upper ends as can be seen for example in FIG. 5. Thus, the dimension between the upper ends of corner-panels 32 and 36 is lesser at the top of the container than at the bottom of the container, and similarly the opposite corner-panels 30 and 34 converge upwardly. In the illustrated embodiment of the invention a hollow handle 38 is formed in the side and top wall portions 14 and 16, and as can be seen best in FIGS. 2 and 3, the hollow handle 38 is located so that it is an extension of the corner-panel 34 and terminates at its upper end adjacent to the neck 18.

Figure 8:
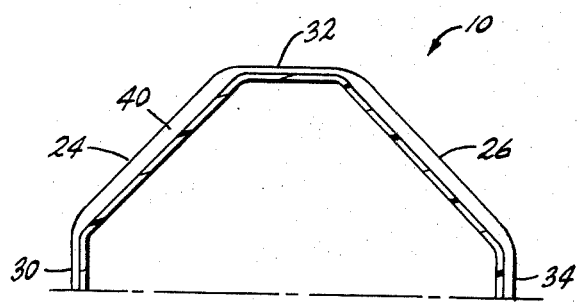
FIG. 8 is a fragmentary section taken on the line 8—8 of FIG. 2.

Extending along the circumference of the jug in the side wall portion 14 is the concave rib 24, which, as can be seen best in FIG. 8, has a deeper round in the side wall panels 22, 24 26 and 28 than in the corner-panels 30, 32, 34 and 36. Also formed in the side wall portion 14 is a second rib 42 which also circumscribes the container adjacent to the lower ends of the wall panels 22, 24, 26 and 28.

As can be seen best in FIG. 4, the bottom wall portion 12 has a concave panel 42 which includes a transverse rib 44 for rigidifying the panel 42 to prevent downward ballooning or bulging of the panel 42.

As previously indicated, the embodiment of the invention illustrated and described is particularly adapted for use with liquid filling apparatus of the type employed in the milk industry wherein intermittent vacuum conditions arise in connection with removing foam from the liquid being introduced into the container. When the illustrated embodiment of the invention is subjected to the conditions of this character, the partial vacuum within the container 10 will result in the wall panels 22, 24, 26 and 28 bowing inwardly over their length, and especially in the region of the rib 40 which acts in part as a hinge permitting the segments of the panels to bow inwardly. The rib also functions to rigidify the side wall portion in a circumferential direction so that the corner panels 30, 32, 34 and 36 can successfully resist inward dimpling or buckling. To further aid in resisting dimpling or buckling of the corner-panels in bottles of certain sizes, the rib 40 has a lesser depth in the corner-panels than in the wall-panels. This is generally true in bottles having relatively narrow widths as distinguished from wide bottles. This relationship also helps to rigidify the corner panels in a vertical direction. The lower rib 40 also serves to aid in rigidifying the side wall portion 14 in a circumferential direction to resist inward dimpling or buckling in this region of the bottle due to the partial vacuum conditions to which the container is subjected.

The construction and arrangement of the illustrated container also is found to be very suitable when pouring liquids from the container. It will be appreciated that if the container 10 is filled with milk, for example, and the milk is poured from the container 10 by holding the container at the upper end adjacent to the handle, the center of gravity of the liquid within the container will be somewhere in the region of the rib 40, tending to deform or to cause dimples to form in portions of the container. The arrangement of the ribs 40 and 42 and the corner panels will resist deformation of the container so that it will retain its illustrated shape.

In conventional milk containers produced heretofore, it has been the normal practice to require a wall thickness of the container of at least 0.030 inch whereas the illustrated embodiment of the invention has produced a highly satisfactory milk container when having a wall thickness as low as 0.018 inch. Thus, it is readily apparent that a substantial saving in weight of raw materials can be realized when manufacturing the container with a design of the type illustrated and described. Not only does the present embodiment of the invention allow the manufacturer to make substantial savings in the cost of the raw material required to manufacture the container, but it also assures a considerably superior product because stresses which are imposed upon the container either during the filling operation or subsequently when liquid is poured therefrom are distributed over the walls of the container and are not concentrated in any one location so as to permanently damage that particular location of the container. It will be readily recognized that even if the container is restored to its original shape by the pressure of the liquid introduced thereinto, any local stress conditions that were imposed upon the bottle during the filling operation may have permanently weakened the bottle at that location so that thereafter if the bottle is dropped or subjected to any severe impact, the container may rupture at that point of local concentration of stresses. Thus, not only does the present design assure that the bottle will be restored to its proper shape, but it avoids the concentration of stresses which would otherwise permanently damage the container, thereby allowing lighter weight or thinner walls than were previously possible.

Another feature of the present invention is the desirable appearance that it makes because of the tapers that appear in the wall-panels and corner-panels. By virtue of the described tapers, the wall-panels 22, 24, 26 and 28 will bulge outwardly an amount so as to make the container appear to have straight vertical walls when filled with liquid, thereby assuring a more attractive appearance when placed on display for sale or distribution.

It is claimed:

1. A relative thin-walled plastic container having a high strength to weight ratio comprising bottom, side and top wall portions, said top wall portion merging to a neck which defines an outlet for the container, said side wall portion including four wall-panels connected at their vertical edges, said wall-panels being tapered outwardly a small degree from their lower ends to their upper ends so that when the container is empty, the dimension between opposite wall-panels is greater at the top than at the bottom, and when the container is filled with liquid the greater extent of bulging of the wall-panels in the lower regions of the container will cause the wall-panels to appear vertical, said wall-panels being connected at their vertical edges by flat corner-panels which taper inwardly a small degree from their lower ends to their upper ends.

2. The relatively thin-walled plastic container that is defined in claim 1, wherein a hollow handle is formed in the side and top wall portions, said handle being located so that it is an extension of one of said corner-panels, the upper end of the handle terminating adjacent to said neck.

3. The relatively thin-walled plastic container that is defined in claim 2, wherein said side wall portion defines a rib that circumscribes the container horizontally below the hollow handle to rigidify the side wall-panels.

4. The relatively thin-walled plastic container that is defined in claim 3 wherein said rib in an inwardly rounded groove which has relatively greater depth in said wall-panels than in said corner-panels.

5. The relatively thin-walled plastic container that is defined in claim 4 wherein said wall-panels have a thickness of less than 0.03 inch.

6. The relatively thin-walled plastic container that is defined in claim 5, wherein said wall-panels have a thickness of about 0.018 inch.

7. The relatively thin-walled plastic container that is defined in claim 6 wherein said bottom wall portion is concave and has a transverse reinforcing rib extending across the concave surface.

8. The relatively thin-walled plastic container that is defined in claim 1, wherein the taper of said wall-panels is approximately one-half degree.

9. A relatively thin-walled plastic container having a high strength to weight ratio comprising bottom, side and top wall portions, said top wall portion merging to a neck which defines an outlet for the container, said side wall portion including four wall-panels connected at their vertical edges by four corner-panels and a rib which circumscribes the container approximately midway of the height of the wall-panels, said rib being rounded inwardly to allow inward bowing of the wall-panels to rigidify the wall-panels in a circumferential direction, and a hollow handle formed in the side and top wall portion, said handle being located so that it is an extension of one of said corner-panels, the upper end of the handle terminating adjacent to said neck.

10. A relatively thin-walled plastic container having a high strength to weight ratio comprising bottom, side and top wall portions, said top wall portion merging to a neck which defines an outlet for the container, said side wall portion including four wall-panels connected at their vertical edges by four corner-panels and a rib which circumscribes the container approximately midway of the height of the wall panels, said rib being an inwardly rounded groove which has relatively greater depth in said wall-panels than in said corner-panels.

11. The relatively thin-walled plastic container that is defined in claim 10, wherein a second rib is formed in said side wall portion circumscribing the container adjacent to the bottom wall portion.

12. The relatively thin-walled plastic container that is defined in claim 12, wherein said wall-panels have a thickness of less than 0.03 inch.

13. The relatively thin-walled plastic container that is defined in claim 12, wherein said wall-panels have a thickness of about 0.018 inch.

* * * * *

UNITED STATES PATENT OFFICE
CERTIFICATE OF CORRECTION

Patent No. 3,708,082      Dated January 2, 1973

Inventor(s) Richard L. Platte

It is certified that error appears in the above-identified patent and that said Letters Patent are hereby corrected as shown below:

Column 6, line 25, "in" should be -- is -- .

Column 7, line 4, "12" should be -- 10 -- .

Signed and sealed this 29th day of May 1973.

(SEAL)
Attest:

EDWARD M. FLETCHER, JR.
Attesting Officer

ROBERT GOTTSCHALK
Commissioner of Patents